United States Patent
LeSuer et al.

(10) Patent No.: US 7,222,265 B1
(45) Date of Patent: May 22, 2007

(54) AUTOMATED SOFTWARE TESTING

(76) Inventors: Brian J. LeSuer, 23 College St., Hopkinton, MA (US) 01748; Kelly A. Adams, 203 Rangeley Rd., Chestnut Hill, MA (US) 02467

( * ) Notice: Subject to any disclaimer, the term of this patent is extended or adjusted under 35 U.S.C. 154(b) by 628 days.

(21) Appl. No.: 10/187,478

(22) Filed: Jul. 1, 2002

Related U.S. Application Data

(60) Provisional application No. 60/302,304, filed on Jul. 2, 2001.

(51) Int. Cl.
*G06F 11/00* (2006.01)

(52) U.S. Cl. .......................... 714/38; 717/126
(58) Field of Classification Search ............... 714/38; 717/126, 134
See application file for complete search history.

(56) References Cited

U.S. PATENT DOCUMENTS

| | | | |
|---|---|---|---|
| 5,335,342 A * | 8/1994 | Pope et al. ................. 714/38 |
| 5,357,452 A * | 10/1994 | Pio-di-Savoia et al. ..... 702/108 |
| 5,414,836 A | 5/1995 | Baer et al. ................. 395/575 |
| 5,634,098 A | 5/1997 | Janniro et al. ......... 395/183.14 |
| 5,652,835 A | 7/1997 | Miller .................. 395/183.14 |
| 5,742,754 A | 4/1998 | Tse ...................... 395/183.14 |
| 5,754,760 A | 5/1998 | Warfield ................ 395/183.14 |
| 5,754,860 A | 5/1998 | McKeeman et al. ........ 395/704 |
| 5,758,061 A | 5/1998 | Plum ..................... 395/183.11 |
| 5,799,266 A * | 8/1998 | Hayes ........................ 702/123 |
| 5,949,999 A | 9/1999 | Song et al. ................. 395/701 |
| 6,031,990 A | 2/2000 | Sivakumar et al. ......... 395/704 |
| 6,067,639 A | 5/2000 | Rodrigues et al. ............ 714/38 |
| 6,219,829 B1 | 4/2001 | Sivakumar et al. ........... 717/4 |
| 6,249,882 B1 | 6/2001 | Testardi ....................... 714/38 |
| 6,804,796 B2 * | 10/2004 | Gustavsson et al. .......... 714/38 |
| 6,889,158 B2 * | 5/2005 | Penov et al. ................. 702/119 |
| 6,938,245 B1 * | 8/2005 | Spertus et al. .............. 717/127 |

* cited by examiner

*Primary Examiner*—Bryce P. Bonzo
(74) *Attorney, Agent, or Firm*—Kristofer E. Elbing

(57) ABSTRACT

An automated software testing method is disclosed. It includes receiving a data set that includes information for testing a software application under test. The received data set is automatically converted into a series of test instructions that is operative to be run against the software application under test.

32 Claims, 8 Drawing Sheets

AUTOMATED SOFTWARE TESTING

CROSS-REFERENCE TO RELATED APPLICATION

This application claims the benefit under 35 U.S.C. 119(e) of U.S. provisional application No. 60/302,304 filed on Jul. 2, 2001, and which is herein incorporated by reference.

REFERENCE TO COMPUTER PROGRAM LISTING APPENDIX

A Computer Program Listing Appendix is hereby expressly incorporated by reference into this application. The Computer Program Listing Appendix includes two duplicate compact discs, which include material subject to copyright as presented below under "Copyright Notice." The files on each compact disc, their size in bytes, and the date on which the files were created in ASCII form for loading on the compact discs are:

| File Name | Size | Date |
|---|---|---|
| sq_engine.t | 7 KB | Jul. 1, 2002 |
| sq_funcs.inc | 40 KB | Jul. 1, 2002 |
| sq_smoketest.t | 2 KB | Jul. 1, 2002 |
| sq_smoketest.pln | 1 KB | Jul. 1, 2002 |

4 files, 49,302 bytes (IBM-PC format CD created under MS-Windows)

COPYRIGHT NOTICE

Portions of the disclosure of this patent document contain material that is subject to copyright protection. The copyright owner has no objection to the facsimile reproduction by anyone of the patent document or patent disclosure as it appears in the Patent and Trademark Office patent file or records, but otherwise reserves all copyright rights whatsoever. Copyright Star Quality 2001, 2002.

FIELD OF THE INVENTION

This application relates to computer software testing, including methods and apparatus for automatically testing computer software applications.

BACKGROUND OF THE INVENTION

Automated software testing tools for software applications have been offered commercially since the late 1970s. Users of these tools can write scripts that provide then with instructions to simulate user actions including computer mouse movements and keyboard presses. Automated testing tools can also be programmed to capture values and state information from the application under test so that these values can be compared to benchmarks and used to ascertain whether the application under test is performing according to specification.

Existing tools allow users to create scripts via manual coding and recording. Manual coding involves writing instructions in a scripting language. Although this method can produce scripts that reliably simulate user actions, these scripts tend to be difficult to create and require the user to be skilled in programming.

Recorders are software programs that monitor and capture user activity including mouse movements and keyboard presses. These events are saved into a file called a recording. Although recorders provide ease of use over manual coding, they can produce scripts that do not work reliably and are difficult to maintain.

SUMMARY OF THE INVENTION

In one general aspect, the invention features an automated software testing method that includes receiving a data set that includes information for testing a software application under test. The received data set is automatically converted into a series of test instructions that is operative to be run against the software application under test.

In preferred embodiments, the step of receiving a data set can receive a stimulus data set that includes a series of pairs that each include a software object identifier and a desired input value for that object. The method can further include a step of automatically generating the data set based on a state of the application under test. The step of automatically generating can generate a stimulus data set by acquiring information submitted to the application by a user. The method can further include a step of acquiring a response data set based on the step of running the set of test instructions. The step of automatically generating can generate a result data set by detecting results from a state of the application. The step of automatically converting can determine methods to generate based on object class and data type. The step of receiving a data set can receive a stimulus data set and further including the step of acquiring a response data set based on the step of running the set of test instructions. The method can further include a step of providing a data set template to the user to fill in before the step of receiving the data set. The method can further include a step of prescribing a four-phase model on a test that includes the series of test instructions, wherein the four phase model includes a setup phase, a test phase, a verify phase, and a cleanup phase. The step of automatically converting can convert the data set into a series of window invocation, result verification, and window close test instructions. The method can further include the step of running the instructions against the software application under test. The step of running the instructions against the software application under test can be performed by an automation agent.

In another general aspect, the invention features an automated software testing method that includes detecting a state of an application under test, and generating a data set based on results of the step of detecting a state of an application under test, with the data set including a series of pairs that each include a software object identifier and a value for that object.

In preferred embodiments, the step of generating can generate a stimulus data set, with the values in the series of pairs being desired input values. The step of generating can generate a response data set, with the values in the series of pairs being desired output values.

In a further general aspect, the invention features a data storage element that includes a machine-readable stimulus data set that includes a series of pairs that each include a software object identifier, and a desired input value for the software object.

In another general aspect, the invention features data storage element that includes a machine-readable response data set that includes a series of pairs that each include a software object identifier, and a desired output value for the software object.

In a further general aspect, the invention features an automated software testing method that includes receiving a series of data structures that each include four sections, with the four sections including a setup section, a test section, a verify section, and a cleanup section. The method also includes testing an application under test based on the contents of the data structures received in the step of receiving.

In preferred embodiments, the method can further include a step of verifying that the series of data structures conform to a formal that includes the four sections. The step of verifying can take place during compilation and issues a compile-time error if the data structures do not include the four sections.

In one general aspect, the invention features an automated software testing system that includes a data set interface operative to interact with a series of data sets, an automation agent interface operative to interact with a software application under test, and a conversion engine between the data set interface and the automation agent interface and operative to convert between data sets and automation interface instructions. In preferred embodiments, the conversion engine can include logic to interact with a stimulus data set that includes a series of pairs that each include a software object identifier and a desired input value for that object. The conversion engine can include logic to interact with a response data set that includes a series of pairs that each include a software object identifier and a desired output value for that object. The automated software testing system can further include logic that is operative to prescribe a four-phase model on a test that includes the series of test instructions, with the four phase model including a setup phase, a test phase, a verify phase, and a cleanup phase. The automated software testing system can further include smoke test generation logic.

In a further general aspect, the invention features as automated software testing system that includes means for receiving a data set including information for testing a software application under test and means for automatically converting the data set received by the means for receiving into a series of test instructions. The means for automatically converting is operative to create a set of test instructions that is operative to be run against the software application under test.

In preferred embodiments, the means for receiving a data set can include means for receiving a stimulus data set that includes a series of pairs that each include a software object identifier and a desired input value for that object. The system can further include means for automatically generating the data set based on a state of the application under test. The means for automatically generating can include means for generating a stimulus data set by acquiring information submitted to the application by a user. The system can further include means for acquiring a response data set based on the step of running the set of test instructions. The system can further include means for automatically generating include means for generating a result data set by detecting results from a state of the application. The means for automatically converting can include means for determining methods to generate based on object class and data type. The means for receiving a data set can include means for receiving a stimulus data set and further including means for acquiring a response data set. The system can further include means for providing a data set template to the user to fill in. The system can further include means for prescribing a four-phase model on a test that includes the series of test instructions, with the four phase model including a setup phase, a test phase, a verify phase, and a cleanup phase. The means for automatically converting can include means for converting the data set into a series of window invocation, result capture, and window close test instructions. The system can further include means for running the set of test instructions against the software application under test.

Systems according to the invention can provide a significant automation benefit to the process of developing software testing scripts. They can allow users to create scripts that are as robust as hand-coded scripts without having to be skilled in programming. They can also generate tests that are more reliable than recordings because they do not use complex software that attempts to watch and capture user actions. The overall result can be an improved return on investment in automated software testing. This can in turn open up the marketplace for automated testing tools to many more users and organizations.

DETAILED DESCRIPTION OF AN ILLUSTRATIVE EMBODIMENT

Figure 1:
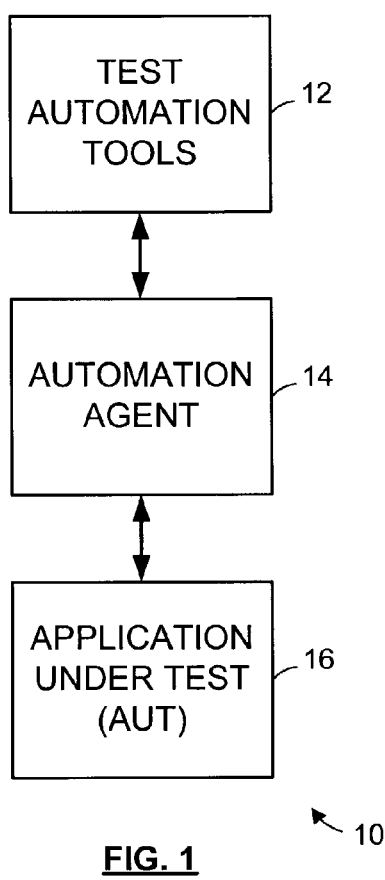
FIG. 1 is a block diagram of an automated software testing system according to the invention.

Referring to FIG. 1, an illustrative automated test system 10 according to the invention can include a set of test automation tools 12 that are operative to interact with a an automation agent 14. The automation agent is in turn operative to interact with a software application under test (AUT) 16.

The automation agent 14 can be an existing off-the shelf automated software testing tool. This type of tool is typically designed to simulate user transactions with an application under test based on a manually coded test script. Suitable commercial products that may serve as the basis for a testing tool with capabilities described herein include WinRunner from Mercury Interactive of Sunnyvale, Calif., SilkTest/QA Partner from Segue Software of Lexingon, Mass., Robot from Rational Software of Cupertino, Calif., and Auto Tester of Dallas, Tex. The illustrative embodiment uses Segue Software's SilkTest testing product, which interprets scripts written in a straightforward scripting language called 4Test. Suitable systems could also be developed based on a basic understanding of the examples given with other off-the-shelf products. A complete, dedicated system could be custom built from scratch.

In operation, the test automation tools 12 receive data sets and automatically translate them into 4Test scripts. It then provides the scripts to the automation agent 14. The automation agent can run these scripts against the application under test 16 in much the same way as if they had been manually coded. The generated scripts are as robust as manually coded scripts and easier to produce than recordings. The resulting scripts are also easier to maintain as the application under test changes over time because they do not store any references to the physical implementation of the application under test.

The data sets describe input and expected results. They can be generated by the user from scratch or by filling in preexisting example templates. They can also be captured from the application under test. These data sets are significantly simpler than executable programming language listings. They do not include complex control flow elements, such as recursion and branching, but are instead preferably simple, linear lists of elements. The data sets also preferably all have the same syntax.

Figure 2:
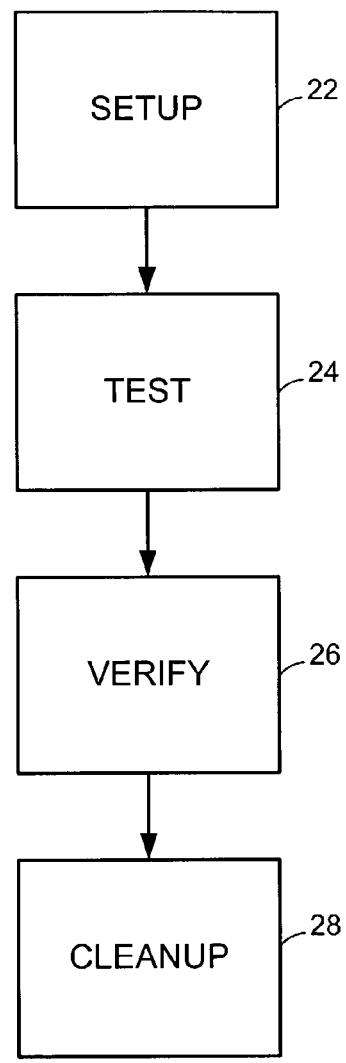
FIG. 2 is block diagram illustrating the four-phase methodology employed by the system of FIG. 1.

Referring to FIG. 2, the automated test system employs a methodology that segments a software test 20 into four phases: setup 22, test 24, verify 26, and cleanup 28. The setup phase includes steps that bring the application under test to the test state. The test phase includes steps that carry out the objective of the test. The verify phase includes steps that verify the results of the test by comparing actual to expected results. And the cleanup phase includes steps that return the application under test back to a known base state. Providing a structure for a test in such fashion promotes the development of test components that are reusable. For example, a method developed for the test step of one test case may be reused as the setup step of another. The system can therefore prescribe implementing this four-phased test methodology in a function that requires that the tasks and data that are to comprise each step be provided in the correct structure.

Figure 3:
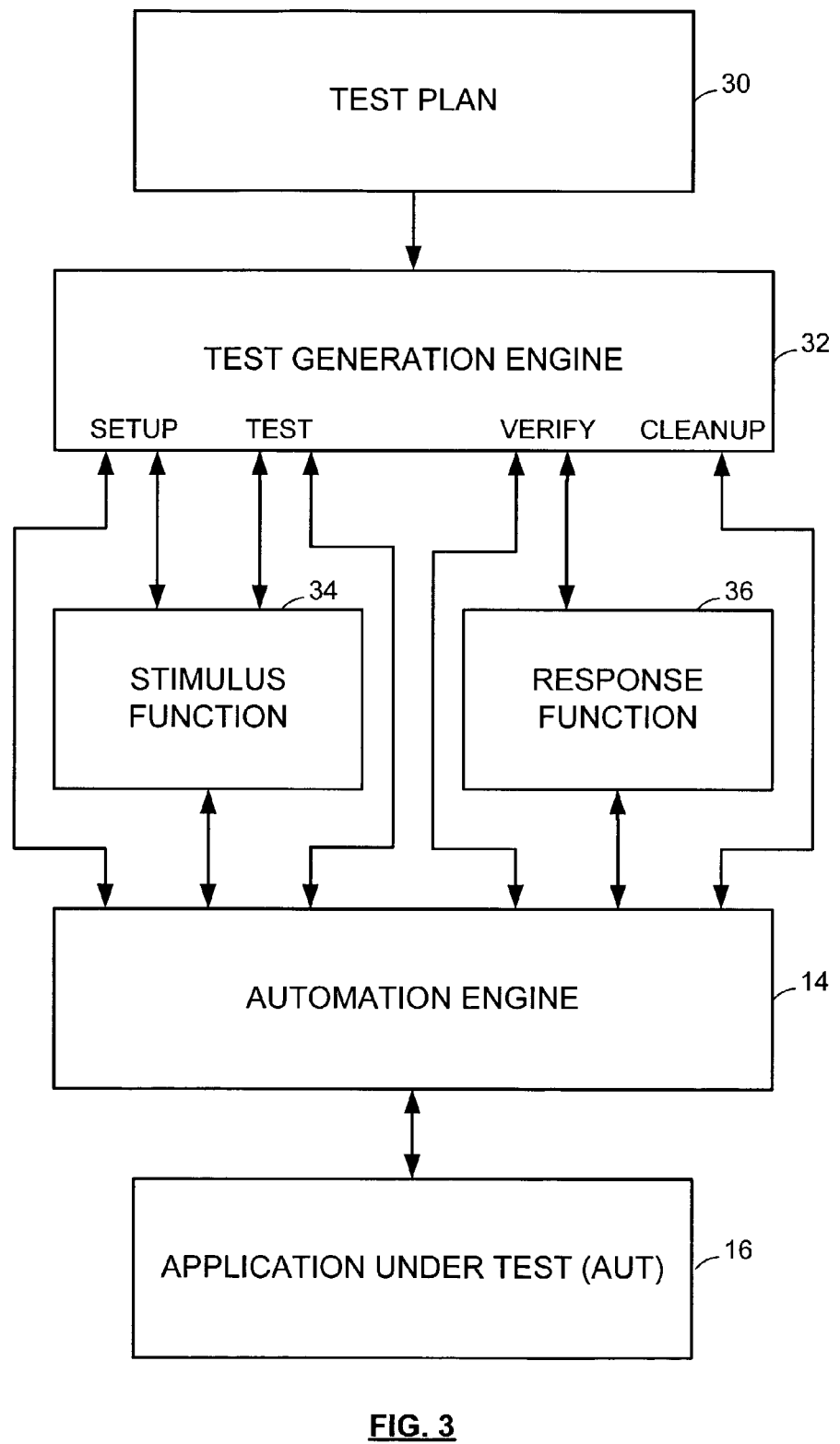
FIG. 3 is a more detailed block diagram of the software testing system of FIG. 1.

Referring to FIG. 3, the automated test system 10 can include a test generation engine 32, which accesses a test plan 30. The test generation engine can also interact with the automation engine 14 and two built-in universal functions, which include a stimulus function 34 and a response function 36. A suitable test generation engine that applies the four-phase methodology described above can be implemented based on the following functional prototype of a function called SQ_Engine, which automatically generates test cases at runtime:

testcase SQ_Engine (LIST OF FUNCTION_DATA lfSetup, LIST OF FUNCTION_DATA lfTest, LIST OF FUNCTION_DATA lfVerify, LIST OF FUNCTION_DATA lfCleanup)

The complete code for this function is listed in the file entitled sq_engine.t, which is located on the Computer Program Listing Appendix disc. It takes four arguments of type LIST OF FUNCTION_DATA. The type FUNCTION_DATA is defined as follows:

type FUNCTION_DATA is record STRING sFuncName LIST OF ANYTYPE laArgs

The STRING sFuncName represents the name of the function to be called. The LIST OF ANYTYPE laArgs is an ordered list of arguments to be passed to the function named in sFuncName. The data passed to The SQ_Engine function through these four arguments defines the testing tasks that are to be carried out by the generated test case. SQ_Engine generates a test case at runtime by calling each function defined in the four arguments, with one set for each phase: setup, test, verify and cleanup. If all four of these arguments are not available, the automation agent will generate a compile error. Other mechanisms could also be used to prescribe the four-phase methodology, such as detection by a pre-parser, detection at runtime, or detection by an interpreter.

To build a test case, the user writes a test plan 30 including the names of the functions and methods to be called along with the values of their arguments for each test to be executed. Generally, these arguments are used to describe the input data and expected results for each test. When the test is to be run, the test plan passes the data to the test generation engine and the test case is generated at runtime. The test generation engine function generates a test case by parsing the method and argument data that is passed to it through its four LIST OF FUNCTION DATA parameters, and generating lines of test script code in the target scripting language.

The two universal functions provided with the system carry out the primary testing tasks for any application object. The stimulus function 34 sends events to application objects based on class of the object. The response function 36 compares the value and state of application objects with predicted results which are stored within the object declaration of the object being verified.

A suitable stimulus function can be implemented based on the functional prototype for a function called SQ_InputData:

VOID SQ_InputData (WINDOW wParent NULL, LIST OF FIELDS lfFieldData)

The complete code for the function is listed in the file entitled sqfuncs.inc, which is located on the Computer Program Listing Appendix disc.

The stimulus function is used to enter data into one or more fields in a form using a single set of data. Entire regression tests for large applications can be based upon this function, with tremendous productivity gains over traditional methods. The stimulus function drives the application under test by setting data values to application objects, which may be members of standard or custom classes. Without writing any additional code, this function makes it possible to set text to text fields (e.g. Microsoft TextFields), select items from list boxes (e.g., Microsoft ListBoxes), and communicate with virtually any application control.

SQ_InputData takes two arguments. The WINDOW wParent is the identifier of the object to be tested. The second argument lfFieldData is a LIST OF FIELDS where FIELDS is defined as follows:

```
type FIELDS is record
    STRING    sField
    ANYTYPEaValue
```

The first member of the record is a STRING that identifies the name of the field to which to input data. The second member, aValue, can be any type. Its actual type will be based on the class of the object being manipulated. For example, if the field takes a BOOLEAN value, aValue would be set to TRUE or FALSE. SQ_InputData takes a list of these field/value pairs and automatically generates test code in the target scripting language at runtime to input data to the application under test.

Figure 4:
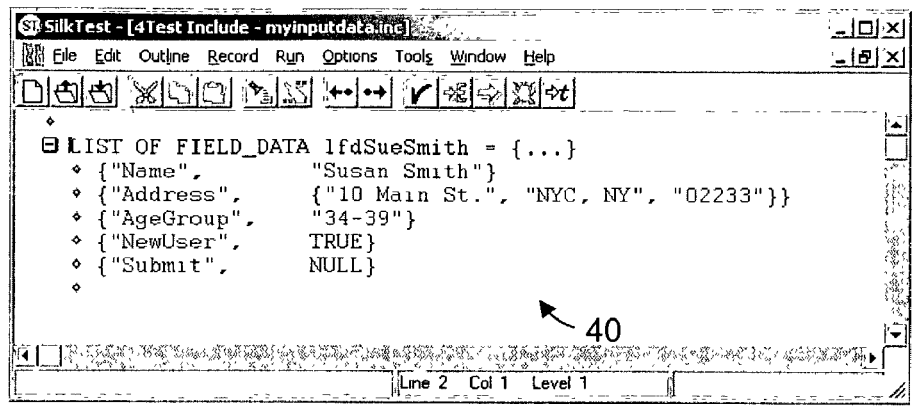
FIG. 4 is a screen view for a set of data that is for filling in a form that includes text fields, list boxes, check boxes, and a push button for the system of FIG. 1.

Referring to FIG. 4, to use this function, the user only needs to supply the data 40 that provides SQ_InputData with its instructions. To create input data for SQ_InputData, the user declares a variable of type LIST OF FIELDS. In each element of the list, the user provides the identifier of an object and the desired input value. All of the sets of FIELDS in this list will be processed in order, in a single call to SQ_InputData.

Figure 5:
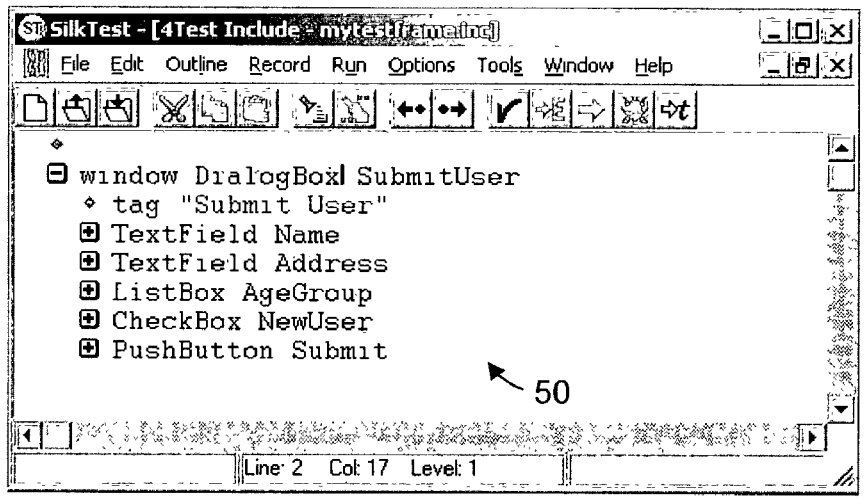
FIG. 5 is a screen view of an object declaration set for the form for which the data set of FIG. 4 is designed for the system of FIG. 1.

Referring also to FIG. 5, in the example shown, the data set is for filling in a form that includes object declarations 50 for text fields, a list box, a check box, and a push button. The corresponding data set therefore includes list elements for the text fields, the list box, and the check box, and the set is terminated with data to cause the automation agent 14 click a submit button in the application under test 16. If submitting data to the form includes clicking a button or following an HTML link, that action may be included in the list of FIELD_DATA. To click with no optional arguments, the user can use the value of NULL for that FIELD_DATA element.

Note that not every field on the form must be specified. Fields that are not included are not changed. This is useful for fields where no value needs to be set or the defaults are to be left in the fields.

In the example data presented in connection with FIGS. 4-5, SQ_InputData will type "Susan Smith" into the Name TextField. It will add 3 lines to the MultiLine TextField Address, "10 Main St.", "NYC, NY", and "02233". It will perform a Select "34-39" from the AgeGroup ListBox, and check the NewUser CheckBox. Finally, SQ_InputData will push the Submit PushButton. SQ_InputData performs all of these actions when supplied with the dataset lfdSueSmith.

SQ_InputData determines the class of the object from its declaration. It then uses a table to look up the input data method to call based on the class of the object and the type of data that is to be input to the object. The table is definition is as follows:

```
type INPUT_DATA_MAPPING is record
    STRING    sClass
    DATATYPE  dType
    STRING    sMethod
```

The first two members of this record are used to look up the input data method to call. The first member, sClass, is a STRING that represents the class of the object. Examples might be "TextField", "PushButton", or "ListBox". The second argument, dType, represents the type of data that is passed to SQ_InputData in aValue. Examples might be STRING, BOOLEAN, or LIST OF STRING. The last member, sMethod, is the input data method that should be called based on the sClass and dType. Examples might be "SetText", "Select", or "SetState".

SQ_InputData performs the appropriate action for controls of each window class. Table 1 provides details on the action that will be performed for each class along with the type of data that must be provided in the input data set.

TABLE 1

| Window Class of sIdentifier | DataType of aValue | 4Test Method Called | Example Data |
|---|---|---|---|
| CheckBox | BOOLEAN | SetState | TRUE |
| ComboBox | STRING | SetText | "sample string" |
| ListBox | LISTITEM | Select | "sample string" |
|  | LIST OF LISTITEM | SelectList | {"one","two","three"} |
| ListView | LISTITEM | Select | "sample string" |
|  | LIST OF LISTITEM | SelectList | {"one","two","three"} |
| Menu | NULL | Pick | NULL |
| MenuItem | NULL | Pick | NULL |
| PageList | LISTITEM | Select | "sample string" |
| PopupList | LISTITEM | Select | "sample string" |
|  | LIST OF LISTITEM | SelectList | {"one","two","three"} |
| PushButton | NULL | Click | NULL |
| RadioList | LISTITEM | Select | "sample string" |
| Scale | NUMBER | SetPosition | 5 |
| ScrollBar | NUMBER | SetPosition | 5 |
| HorizontalScrollBar | NUMBER | SetPosition | 5 |
| VerticalScrollBar | NUMBER | SetPosition | 5 |
| TextField | STRING | SetText | "sample string" |
|  | LIST OF STRING | SetMultiText | {"one","two","three"} |
| TreeView | LISTITEM | Select | "sample string" |
|  | LIST OF LISTITEM | SelectList | {"one","two","three"} |
| UpDown | STRING | SetText | "sample string" |
| HtmlCheckBox | BOOLEAN | SetState | TRUE |
| HtmlComboBox | STRING | SetText | "sample string" |
| HtmlImage | NULL | Click | NULL |
| HtmlLink | NULL | Click | NULL |
| HtmlListBox | LISTITEM | Select | "sample string" |
|  | LIST OF LISTITEM | SelectList | {"one","two","three"} |
| HtmlPopupList | LISTITEM | Select | "sample string" |
|  | LIST OF LISTITEM | SelectList | {"one","two","three"} |
| HtmlPushButton | NULL | Click | NULL |
| HtmlRadioList | LISTITEM | Select | "sample string" |
| HtmlTextField | STRING | SetText | "sample string" |
|  | LIST OF STRING | SetMultiText | {"one","two","three"} |
| JavaAwtCheckBox | BOOLEAN | SetState | TRUE |
| JavaAwtListBox | LISTITEM | Select | "sample string" |
|  | LIST OF LISTITEM | SelectList | {"one","two","three"} |
| JavaAwtPopupList | LISTITEM | Select | "sample string" |
|  | LIST OF LISTITEM | SelectList | {"one","two","three"} |
| JavaAwtPushButton | NULL | Click | NULL |
| JavaAwtRadioList | LISTITEM | Select | "sample string" |
| JavaAwtScrollBar | NUMBER | SetPosition | 5 |
| JavaAwtTextField | STRING | SetText | "sample string" |
|  | LIST OF STRING | SetMultiText | {"one","two","three"} |
| JavaCheckBox | BOOLEAN | SetState | TRUE |
| JavaImage | NULL | Click | NULL |
| JavaListBox | LISTITEM | Select | "sample string" |
|  | LIST OF LISTITEM | SelectList | {"one","two","three"} |
| JavaPopupList | LISTITEM | Select | "sample string" |
|  | LIST OF LISTITEM | SelectList | {"one","two","three"} |
| JavaPushButton | NULL | Click | NULL |
| JavatRadioList | LISTITEM | Select | "sample string" |
| JavaScrollBar | NUMBER | SetPosition | 5 |

TABLE 1-continued

| Window Class of sIdentifier | DataType of aValue | 4Test Method Called | Example Data |
|---|---|---|---|
| JavaTextField | STRING | SetText | "sample string" |
| | LIST OF STRING | SetMultiText | {"one","two","three"} |
| JavaJFCCheckBox | BOOLEAN | SetState | TRUE |
| JavaJFCComboBox | STRING | SetText | "sample string" |
| JavaJFCListBox | LISTITEM | Select | "sample string" |
| | LIST OF LISTITEM | SelectList | {"one","two","three"} |
| JavaJFCPageList | LISTITEM | Select | "sample string" |
| JavaJFCPushButton | NULL | Click | NULL |
| JavaJFCRadioList | LISTITEM | Select | "sample string" |
| JavaJFCScale | NUMBER | SetPosition | 5 |
| JavaJFCScrollBar | NUMBER | SetPosition | 5 |
| JavaJFCTextField | STRING | SetText | "sample string" |
| | LIST OF STRING | SetMultiText | {"one","two","three"} |
| JavaJFCTreeView | LISTITEM | Select | "sample string" |
| | LIST OF LISTITEM | SelectList | {"one","two","three"} |
| JavaItoolsComboBox | STRING | SetText | "sample string" |
| JavaItoolsListBox | LISTITEM | Select | "sample string" |
| | LIST OF LISTITEM | SelectList | {"one","two","three"} |
| JavaItoolsPageList | LISTITEM | Select | "sample string" |
| JavaItoolsPushButton | NULL | Click | NULL |
| JavaItoolsScale | NUMBER | SetPosition | 5 |
| JavaItoolsTreeView | LISTITEM | Select | "sample string" |
| | LIST OF LISTITEM | SelectList | {"one","two","three"} |
| JavaItoolsUpDown | STRING | SetText | "sample string" |
| OLESSCheckBox | BOOLEAN | SetState | TRUE |
| OLESSTab | LISTITEM | Select | "sample string" |
| OLESSCommandButton | NULL | Click | NULL |
| OLEDBComboBox | STRING | SetText | "sample string" |
| OLEDBListBox | LISTITEM | Select | "sample string" |
| | LIST OF LISTITEM | SelectList | {"one","two","three"} |
| OLEListView | LISTITEM | Select | "sample string" |
| | LIST OF LISTITEM | SelectList | {"one","two","three"} |
| OLEMaskEdBox | STRING | SetText | "sample string" |
| | LIST OF STRING | SetMultiText | {"one","two","three"} |
| OLETabStrip | LISTITEM | Select | "sample string" |
| OLEAniPushButton | NULL | Click | NULL |
| OLERadioList | LISTITEM | Select | "sample string" |
| OLERichTextBox | STRING | SetText | "sample string" |
| | LIST OF STRING | SetMultiText | {"one","two","three"} |
| OLESlider | NUMBER | SetPosition | 5 |
| OLETreeView | LISTITEM | Select | "sample string" |
| | LIST OF LISTITEM | SelectList | {"one","two","three"} |
| OLESpinButton | STRING | SetText | "sample string" |
| OLEUpDown | STRING | SetText | "sample string" |
| VBCheckBox | BOOLEAN | SetState | TRUE |
| VBComboBox | STRING | SetText | "sample string" |
| VBCommandButton | NULL | Click | NULL |
| VBListBox | LISTITEM | Select | "sample string" |
| | LIST OF LISTITEM | SelectList | {"one","two","three"} |
| VBDriveListBox | LISTITEM | Select | "sample string" |
| | LIST OF LISTITEM | SelectList | {"one","two","three"} |
| VBFileListBox | LISTITEM | Select | "sample string" |
| | LIST OF LISTITEM | SelectList | {"one","two","three"} |
| VBRadioList | LISTITEM | Select | "sample string" |
| VBHScrollBar | NUMBER | SetPosition | 5 |
| VBVScrollBar | NUMBER | SetPosition | 5 |
| VBTextBox | STRING | SetText | "sample string" |
| | LIST OF STRING | SetMultiText | {"one","two","three"} |
| VBImage | NULL | Click | NULL |
| VBPictureBox | NULL | Click | NULL |
| VBShape | NULL | Click | NULL |

Using the data passed through its arguments and the input data method looked up in the lookup table, SQ_InputData generates test code that inputs data to application objects at runtime. The structure of a generated line of code follows:

wParent.sField.sInputDataMethod(aValue)

SQ_InputData generates a series of such lines of code based on the number of data elements passed to it through its argument lfFieldData.

Figure 6:
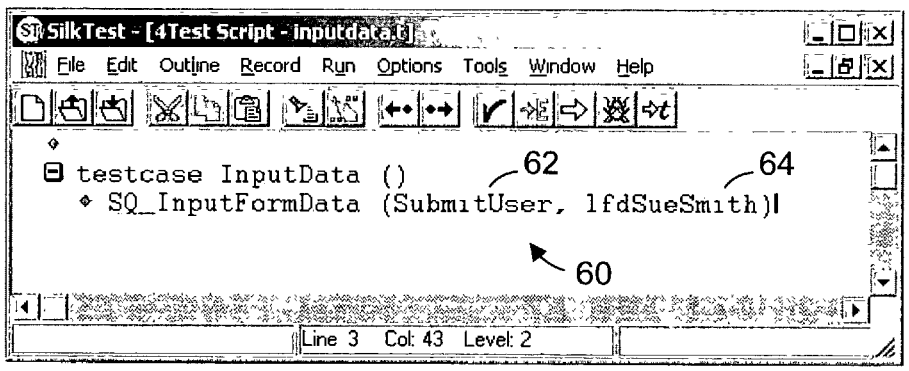
FIG. 6 is a call to the stimulus function using the data set of FIG. 4.

Referring to FIG. 6, the user begins a call to SQ_InputData by including a call to SQ_InputData 60 in his or her test case, function or test plan. He or she then provides two arguments: the identifier 62 of the window to which data will be input (the form) and the LIST OF FIELD_DATA 64 which provides the names of the window's controls and the values to be input.

Figure 7:
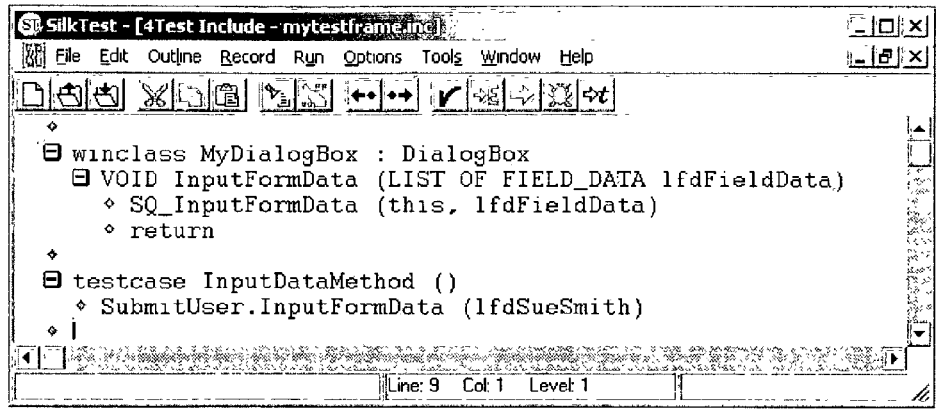
FIG. 7 is a screen view for a stimulus function wrapped as a method in a class so that it can be called as a member function for the system of FIG. 1.

Referring to FIG. 7, to wrap SQ_InputData as a method in a class so that it can be called as a member function, the user begins by creating a new class or deriving a user-defined class from an existing class as follows:

winclass My DialogBox:DialogBox

The user then creates a method in the new class called InputData that has a signature like SQ_InputData with the exception of the first argument as follows:

VOID InputData (LIST OF FIELD_DATA lfdFieldData)

The user then calls SQ_InputData from within the method passing it the window and lfdFieldData as follows:

SQ_InputData (this, lfdFieldData)

Figure 8:
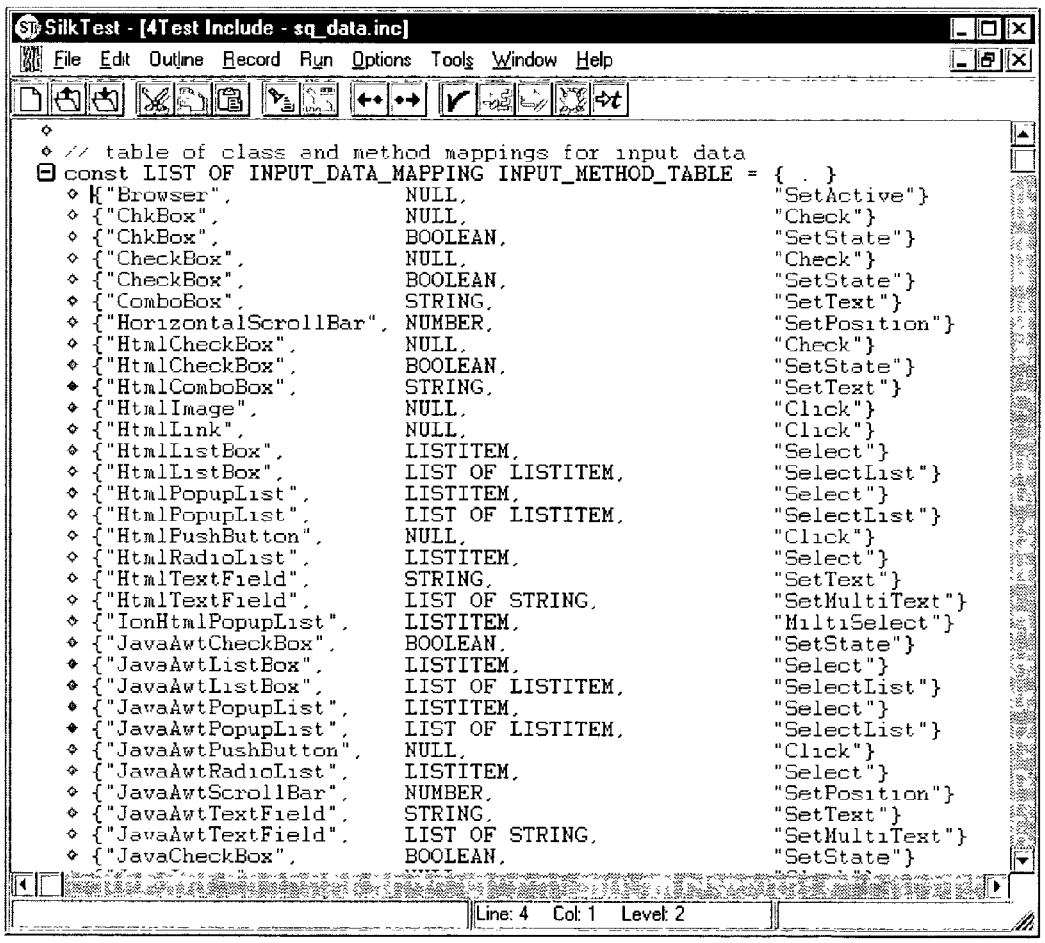
FIG. 8 is a table that extends a stimulus function for the system of FIG. 1.

Referring to FIG. 8, to extend SQ_InputData, the user begins by opening the sq_data.inc file. The user can then locate a data table called INPUT_METHOD_TABLE by finding text, such as the following lines:

//table of class and method mappings for input data const
LIST OF INPUT_DATA_MAPPING INPUT_ METHOD_TABLE={ . . . }

The user can then add a row to the table to called INPUT_METHOD_TABLE. This new row will include the name of the custom class, the expected data type of the input data and the name of the method to be called. For example when adding a row for a method called SetCellValue for a custom grid, the new table row might look like the following:

{"MyGrid", CELL_VALUE, "SetCellValue"} where CELL_VALUE is a user defined type that includes the TABLECELL and the value to be set. Once the table has been updated as described, the user can use SQ_InputData for the custom controls in the same way that he or she would use if for standard controls.

Referring again to FIG. 3, a suitable response function 36 can be implemented based on the following functional prototype for a function called SQ_InputData:

VOID SQ_VerifyProperties (WINDOW wParent, BOOLEAN bVerbose optional, STRING sPropertyList optional)

The complete code for the function is listed in the file entitled sqfuncs.inc, which is located on the Computer Program Listing Appendix disc.

This response function is used to perform verification against a window and its controls using a single set of data. It is possible to create a comprehensive GUI smoke test in as little as a day or two for most applications with this function. This function is also useful for verifying all sorts of properties for functional testing.

The response function gets the requested properties of a window (a form) and its objects at runtime and compares them to a set of previously recorded expected results. Without writing any additional code, properties can be verified such as the value of a text field, the state of a check box, the selected value of a list box, or the enabled state of a push button, as well as any other property that is available for standard or custom objects.

Figure 9:
FIG. 9 is a screen view of a list declaration for an open dialog box for the system of FIG. 1.

Referring to FIG. 9, to use this function, the user need only supply the property data that SQ_Verify Properties needs for verification. This data consists of two lists of properties to verify: one for the parent window (the form) and one for the child objects to be verified. This data is captured by running a test script that records state and value data from the application under test. This capture script is described in more detail below.

The property sets are stored as member variables within the window declarations for the form to be tested. The name of the data member is "lsProperties", if not specified. However, it can be named anything the user chooses, and multiple property sets can therefore be declared for each window for different verification purposes. The type of the variable is LIST. The SQ_VerifyFormProperties function has three arguments are further described as follows:

| WINDOW | wWindow | indicates the window upon which to verify properties |
|---|---|---|
| BOOLEAN | bVerbose | indicates whether or not SQ_VerifyFormProperties will write the actual results to the results file. If bVerbose is set to TRUE, the results file displays the value of each property called. Optional (default is TRUE). |
| STRING | sPropertyList | the name of the dataset. Optional (default is "lsProperties") |

If users have multiple datasets for a given window, they can create their own names that reference the context of the dataset. For example, a user might have a dataset called "lsInitialProperties" or "lsDefaultProperties" that stores the expected results of properties when a window is first invoked and another dataset called "lsPropertiesAfterDataEntry" which reflects a subsequent data state.

SQ_VerifyProperties is a nested function in that it will verify multiple levels of windows. If a window has frames, applet windows or other types of sub-window, only one call to SQ_VerifyFormProperties is required. Properties of the form are verified as well as properties of the children, for as many generations as are required.

Figure 10:
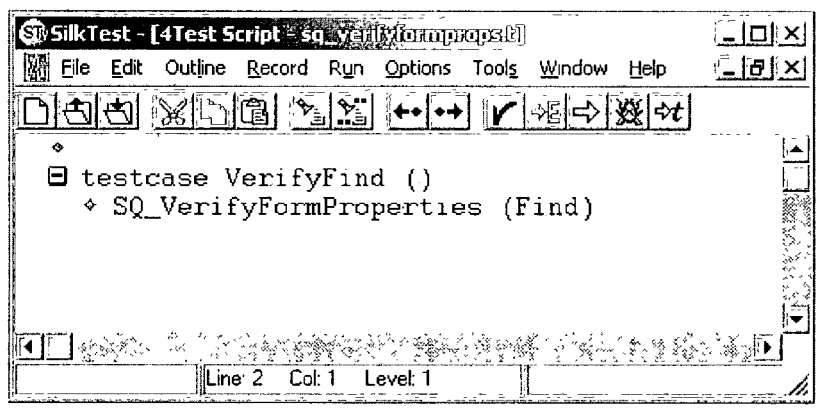
FIG. 10 is a screen view of a call to a result capture function for the system of FIG. 1 with default parameters for the system of FIG. 1.

Referring to FIG. 10, the user calls SQ_VerifyFormProperties by including a call to SQ_VerifyFormProperties in his or her test case, function or test plan. The user can also provide a first argument and optional second and third arguments. The first argument, wWindow, is the identifier of the window or form to verify and is the only necessary argument.

Figure 11:
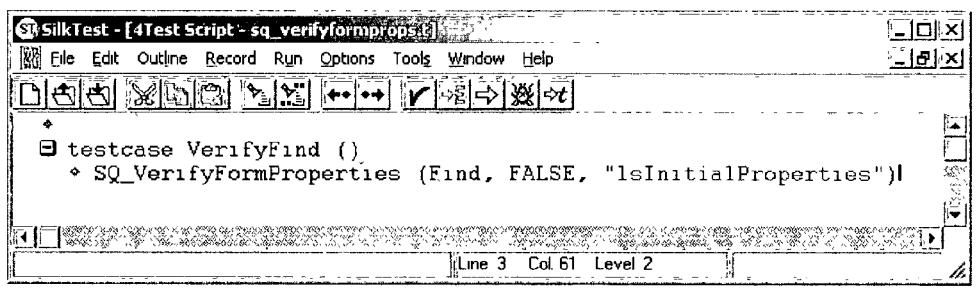
FIG. 11 is a screen view of a call to a result capture function for the system of FIG. 1 where default parameters have been overridden for the system of FIG. 1.

Referring to FIG. 11, the user can override default settings using the second and third arguments. The second argument is set to FALSE only if the user does not want actual property values to be written to the results file. The third argument, sPropertyList, is set to the name of the data set if the user wants to override the default name, lsProperties.

The list of expected results provides SQ_VerifyProperties with field/value pairs to generate verification test code. Based on the class of the object being verified, SQ_VerifyProperties generates a line of test code that calls the appropriate property to get the value of the object being verified at runtime. An example of a generated line of code to get an object value at runtime follows:

wParent.GetProperty(sqProperty.sProperty)

SQ_VerifyProperties then compares that value to the one stored in the list of expected results that was provided as an input argument. SQ_VerifyProperties flags an error for each actual property value that does not match the expected value in lProperties. If bVerbose is set to TRUE, SQ_VerifyProperties sends the results to the test results file. Note that as shown in FIG. 3, SQ_InputData is primarily used in the setup and test steps of the testcase, while SQ_VerifyProperties is exclusively used for the verify step of the testcase.

The automated test system can provide two additional that functions provide a means for capturing input data and predicted results so that the user does not have to type them. The first is an input capture function that captures field values from a software application and stores them in a file to be used as input to the stimulus function. The second additional function is a result capture function that captures the expected values and stores them in a file to be used by the response function.

Figure 12:
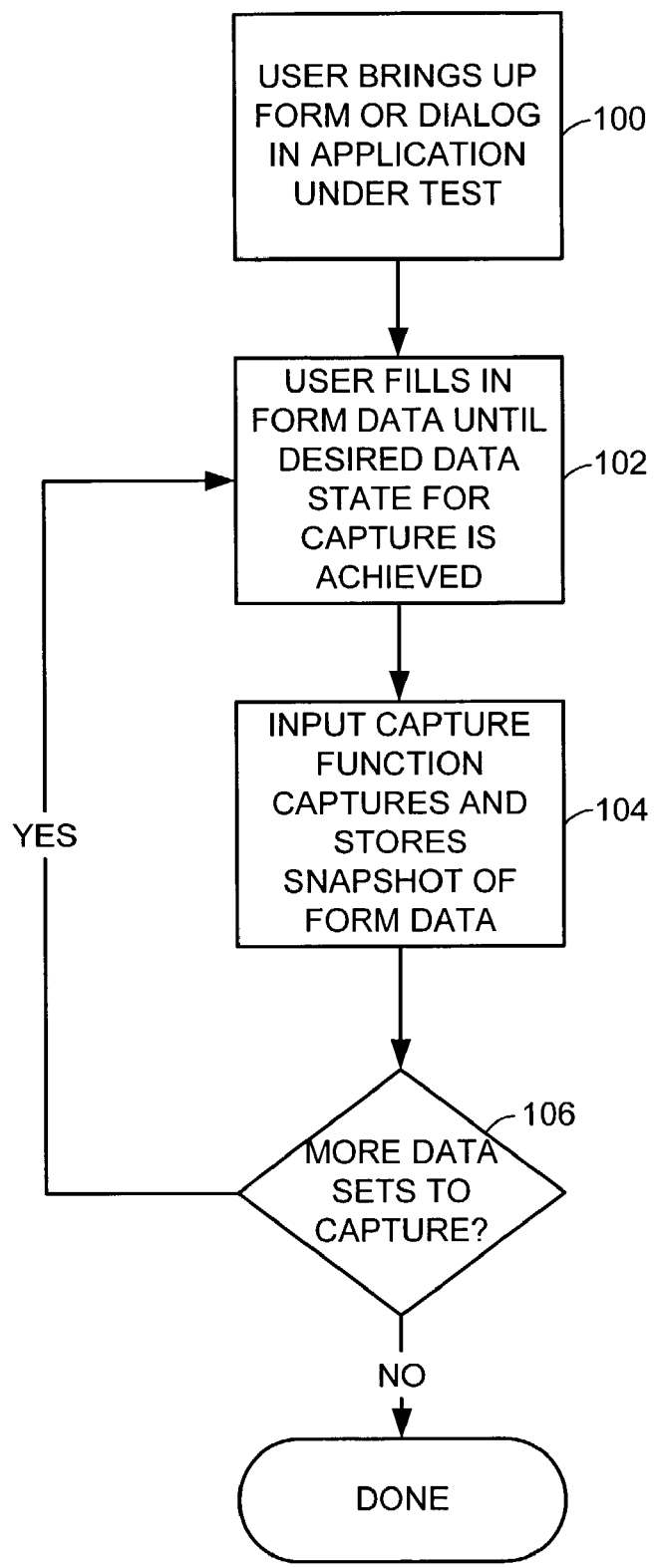
FIG. 12 is a flowchart illustrating the operation of an automated input capture function for use with the system of FIG. 1.

Referring to FIG. 12, use of the input capture function begins with the user bringing up the form or dialog in the application under test (step 100). The user fills in this form with form data until a desired data state for capture is achieved (step 102). The user then calls the input capture function, which captures a snapshot of the form data and stores it as a data record. The process can then be repeated for further data sets for a form (see step 104).

A suitable input capture function can be implemented based on the following prototype for the SQ_CaptureInputData function:

SQ_CaptureInputData (WINDOW wToCapture, STRING sRecordName)

The complete code for the function listed in the file entitled sqfuncs.inc, which is located on the Computer Program Listing Appendix disc. The SQ_CaptureInputData function takes two arguments. The first argument, wToCapture, is the identifier of the window for which to capture input data. The second argument, sRecordName, is the name of the variable of type FIELDS in which to store the captured values. SQ_CaptureInputData gets a list of child objects of the parent window defined in wToCapture. For each object in the list, it calls the appropriate get method based on the class of the object. SQ_CaptureInputData stores a data record of type FIELDS, which is the same type used by SQ_InputData. The record is written to a file where the user can copy it into the declaration of the window being tested.

Figure 13:
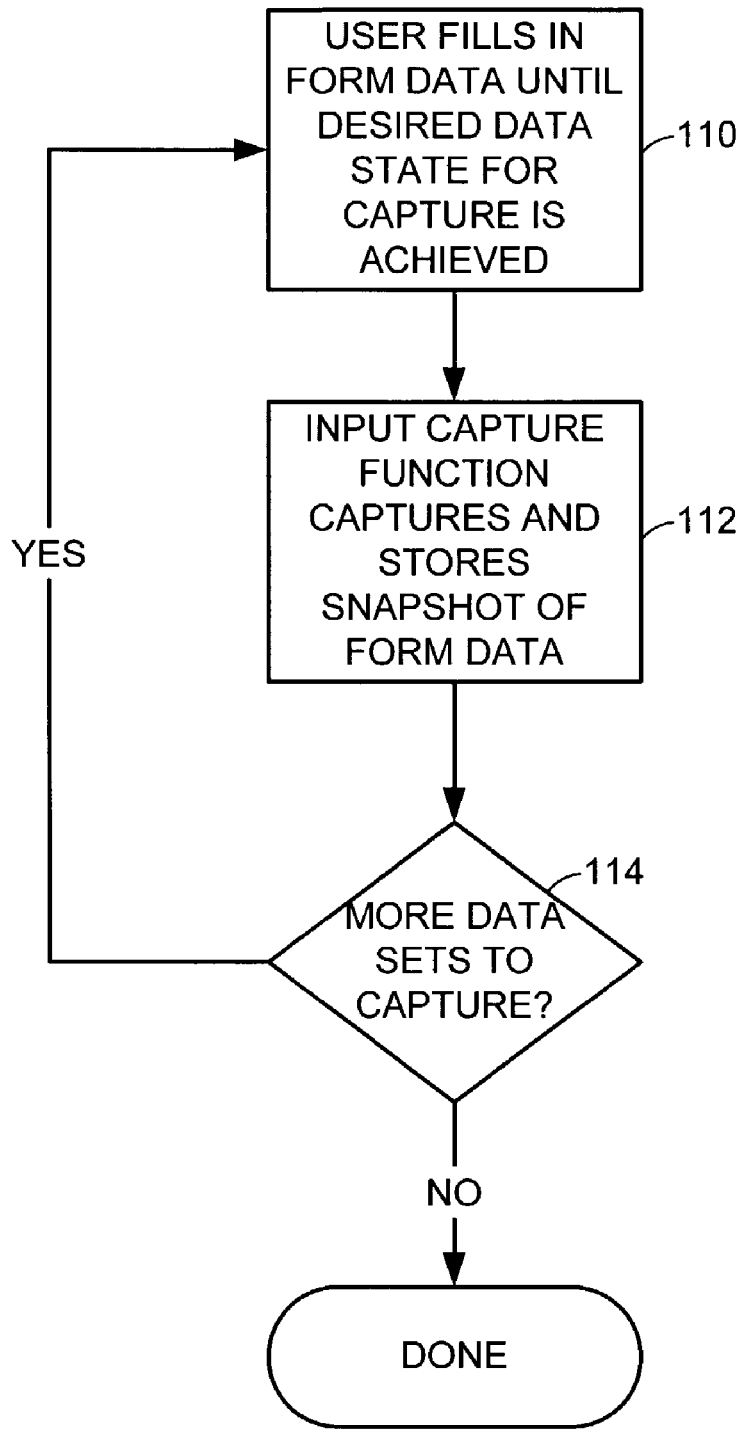
FIG. 13 is a flowchart illustrating the operation of an automated result capture function for use with the system of FIG. 1.

Referring to FIG. 13, the result capture function begins its operation by opening a window to capture using optional invoke arguments (step 110). The function then captures a snapshot of form properties and stores them as a data record (step 112). The process can then be repeated for further windows (see step 114).

A suitable input capture function can be implemented based on the following prototype for the SQ_GetProperties function:

VOID SQ_GetProperties (WINDOW wParent, STRING sPropSetFile, STRING sPropSet, LIST OF ANYTYPE laInvokeArgs optional, STRING sPropListName optional, BOOLEAN bReturnDynamic optional)

The complete code for the function listed in the file entitled sqfuncs.inc, which is located on the Computer Program Listing Appendix disc. SQ_GetProperties takes six arguments. The first argument, wParent, is the identifier of the window for which to capture verification data. The second argument, sPropSetFile, is the name of the file that contains the names of the properties to capture for each class of object in the application under test. The third argument, laInvokeArgs, is a list of arguments to pass to the invoke method of the parent window. The forth argument, sPropListName is the name of the property set within the file sPropSetFile to use for the current window being captured. The last argument, bReturnDynamic, is a BOOLEAN which specifies whether to capture properties for child objects of wParent that have not been declared.

Figure 14:
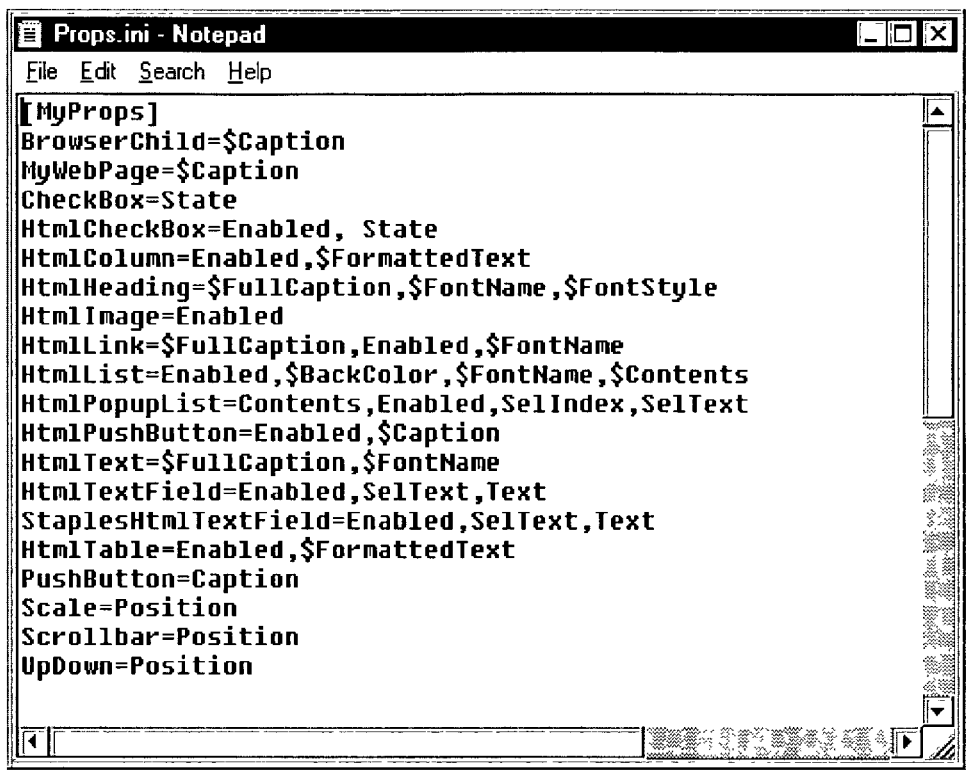
FIG. 14 is a screen view of a property set file.
Figure 15:
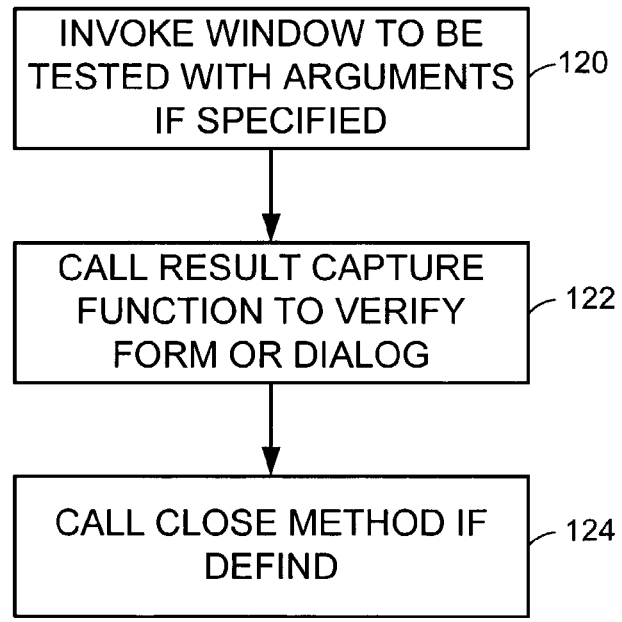
FIG. 15 is a flowchart illustrating the operation of a smoke test tool for use with the system of FIG. 1.

SQ_GetProperties calls the invoke method of the window specified by the wParent argument. It accesses the property set stored in sPropListName in the file specified by sPropSetFile. This property set provides the list of properties to capture for each object class. An example of a property set file is shown in FIG. 14.

Using this property set, SQ_GetProperties would capture the caption of a BrowserChild, the caption of a WebPage, the state of a Checkbox, etc. For each child object of wParent, SQ_GetProperties captures the properties and stores them in a file where they can be copied by the user into the declaration of the window being tested.

The automated software test system also includes a smoke test package, which contains a specialized smoke test engine and functions that allow users to build smoke tests for client-server and web based applications without having to write any scripting code. The smoke test package can be implemented using the following prototype for the SQ_SmokeTest function:

testcase SQ_SmokeTest (WINDOW wWindowToVerify, LIST OF ANYTYPE laArgs optional)

The complete code for the function listed in the file entitled sqfuncs.inc, which is located on the Computer Program Listing Appendix disc. SQ_SmokeTest takes two arguments. The first argument, wWindowToVerify, is the name of the window object to test. The second argument, laArgs, is a list of arguments to pass to the invoke method of the window object to test. The smoke test performs three tasks. It invokes the window to be tested by calling its invoke method (step 120), calls the result capture function (SQ_VerifyProperties—step 122) and then calls the window object's close method if it is defined (step 124). The smoke test can be called from a test plan, main function or any other test case driver where a list of windows to test can be specified.

To build a smoke test, the user provides only simple invoke and close methods and expected results, all of which can be recorded. The user begins by opening a smoke test template and locates a line that includes the words "List of Windows to be included in the smoketest". Under that heading, the user lists the names of the windows to be tested. The user then begins to create invoke methods using the SilkTest record declarations feature to capture the window declarations for each window to be included in the smoke test. He or she can then write or record an invoke method for each window. Some invoke methods require only a single 4Test statement. For example:

VOID Invoke ( ) MyApp.File.Open.Pick( ) return

Other invoke methods require data to be input to the application to create a context for invoking a window. To complete this step, the smoke test package includes a function called SQ_InputFormData. It is provided so that no additional 4Test code needs to be written to create the application context. An example of an Invoke method using SQ_InputFormData follows.

LIST OF FIELD_DATA lfdSueSmith={. . . }{"Name", "Susan Smith"}{"Address", {"10 Main Street", "NYC, NY", "02233"}}{"AgeGroup", "34-39"}{"NewUser", TRUE}{"Submit", NULL}

VOID Invoke ( ) MyApp.File.Open.Pick( ) SQ_InputFormData (this, lfdSueSmith) return The user then creates close methods. Some windows will not require a close method because the built-in 4Test close method may suffice. If closing a window does require a custom close method, the user can use the same steps as described above to write or record one. The datasets used by the smoke test package for expected results are recorded using SilkTest's verify window.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. An automated software testing method, comprising the steps of:
receiving a user-created stimulus data set including series of pairs that each include a user interface object identifier and a desired action identifier for that object, wherein the pairs are for testing user interface objects of a software application under test, identified by the identifiers in the data set,
automatically converting the data set received in the step of receiving into a series of test instructions for the user interface objects, and
wherein the set of test instructions is operative to be run against the user interface objects of the software application under test.

2. The method of claim 1 wherein the step of receiving a data set receives a stimulus data set that includes a series of pairs that each include a software object identifier and a desired input value for that object.

3. The method of claim 1 further including a step of automatically generating the data set based on a state of the application under test.

4. The method of claim 3 wherein the step of automatically generating generates a stimulus data set by acquiring information submitted to the application by a user.

5. The method of claim 4 further including a step of acquiring a response data set based on the interaction with the user.

6. The method of claim 3 wherein the step of automatically generating generates a response data set by detecting responses from a state of the application.

7. The method of claim 1 wherein the step of automatically converting determines methods to generate based on object class and data type.

8. The method of claim 1 further including a step of providing a data set template to the user to fill in before the step of receiving the data set.

9. The method of claim 1 further including a step of prescribing a four-phase model on a test that includes the series of test instructions, wherein the four phase model includes a setup phase, a test phase, a verify phase, and a cleanup phase.

10. The method of claim 1 wherein the step of automatically converting converts the data set into a series of window invocation, result capture, and window close test instructions.

11. The method of claim 1 further including a step of running the instructions against the user interface objects of the software application under test.

12. The method of claim 11 further including a step of acquiring a response data set based on the step of running the set of test instructions.

13. The method of claim 11 wherein the step of running the instructions against the user interface objects of the software application under test is performed by an automation agent.

14. The method of claim 1 further including the step of performing a smoke test based on the data set received in the step of receiving.

15. An automated software testing system, comprising:
- a data set interface operative to interact with a series of user-created stimulus data sets each including a series of pairs that each include a user interface object identifier and a desired action identifier for that object, wherein the pairs are for testing the user interface objects of a software application under test identified by the identifiers in the data set,
- an automation agent interface operative to interact with a user interface objects of the software application under test, and
- a conversion engine between the data set interface and the automation agent interface and operative to convert between the user-created data sets and automation interface instructions.

16. The apparatus of claim 15 wherein the conversion engine includes logic to interact with a stimulus data set that includes a series of pairs that each include a software object identifier and a desired input value for that object.

17. The apparatus of claim 16 wherein the conversion engine includes logic to interact with a response data set that includes a series of pairs that each include a software object identifier and a desired output value for that object.

18. The apparatus of claim 15 wherein the automated software testing system further includes logic that is operative to prescribe a four-phase model on a test that includes the series of test instructions, wherein the four phase model includes a setup phase, a test phase, a verify phase, and a cleanup phase.

19. The apparatus of claim 15 wherein the automated software testing system further includes smoke test generation logic.

20. An automated software testing system, comprising:
- means for receiving a user-created stimulus data set including a series of pairs that each include a user interface object identifier and a desired action identifier for that object, wherein the pairs are for testing the user interface objects of a software application under test identified by the identifiers in the data set,
- means for automatically converting the data set received by the means for receiving into a series of test instructions for the user interface objects, and
- wherein the means for automatically converting is operative to create a set of test instructions that is operative to be run against the user interface objects of the software application under test.

21. The apparatus of claim 20 wherein the means for receiving a data set include means for receiving a stimulus data set that further includes desired output values for the objects.

22. The apparatus of claim 20 further including means for automatically generating the data set based on a state of the application under test.

23. The apparatus of claim 22 wherein the means for automatically generating include means for generating a stimulus data set by acquiring information submitted to the application by a user.

24. The apparatus of claim 23 further including means for acquiring a response data set based on a step of running the set of test instructions.

25. The apparatus of claim 22 wherein means for automatically generating include means for generating a result data set by detecting results from a state of the application.

26. The apparatus of claim 20 wherein the means for automatically converting include means for determining methods to generate based on object class and data type.

27. The apparatus of claim 20 further including means for acquiring a response data set.

28. The apparatus of claim 20 further including means for providing a data set template to the user to fill in.

29. The apparatus of claim 20 further including means for prescribing a four-phase model on a test that includes the series of test instructions, wherein the four phase model includes a setup phase, a test phase, a verify phase, and a cleanup phase.

30. The apparatus of claim 20 wherein the means for automatically converting include means for converting the data set into a series of window invocation, result verification, and window close test instructions.

31. The apparatus of claim 20 further including means for running the set of test instructions against the software application under test.

32. The apparatus of claim 20 further including means for performing a smoke test.

* * * * *